Jan. 8, 1963  R. C. BAUMANN ETAL  3,072,363
SPIN ADJUSTING MECHANISM
Filed April 30, 1959  4 Sheets-Sheet 3

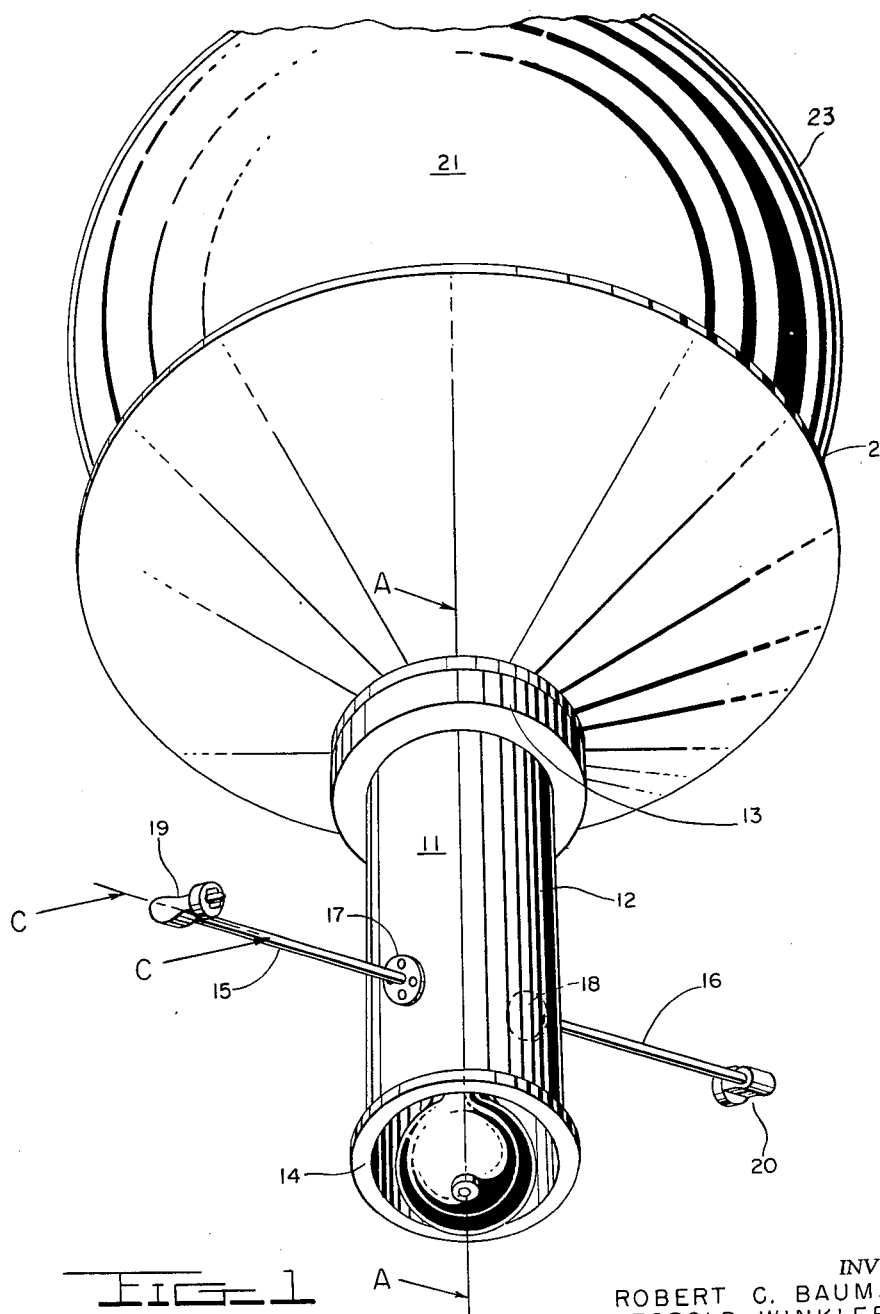

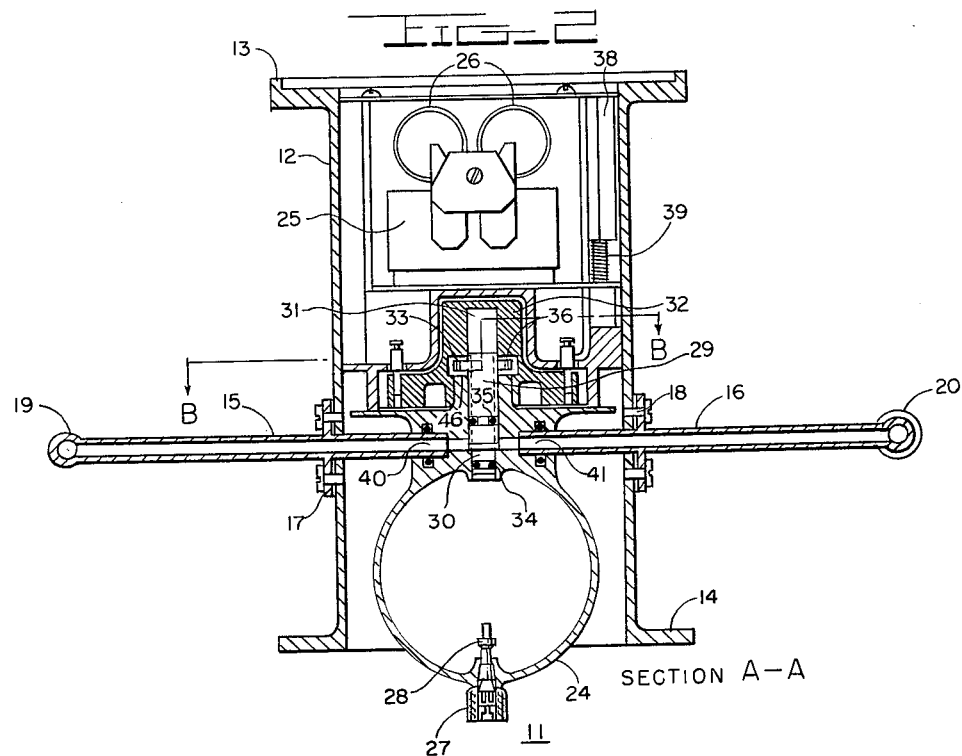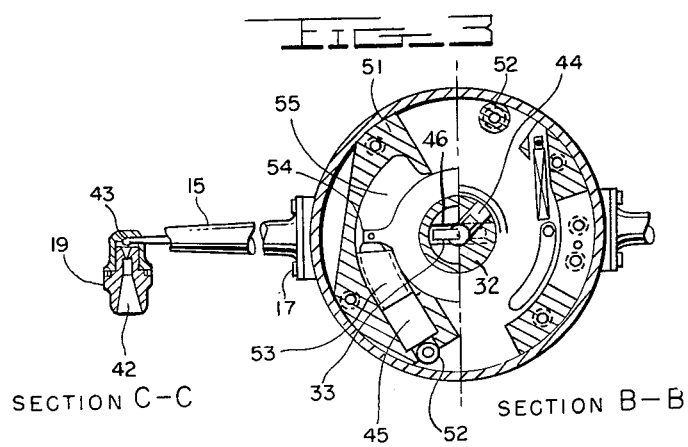

INVENTORS
ROBERT C. BAUMANN
LEOPOLD WINKLER

BY *Richard* *Ahead*
ATTORNEY

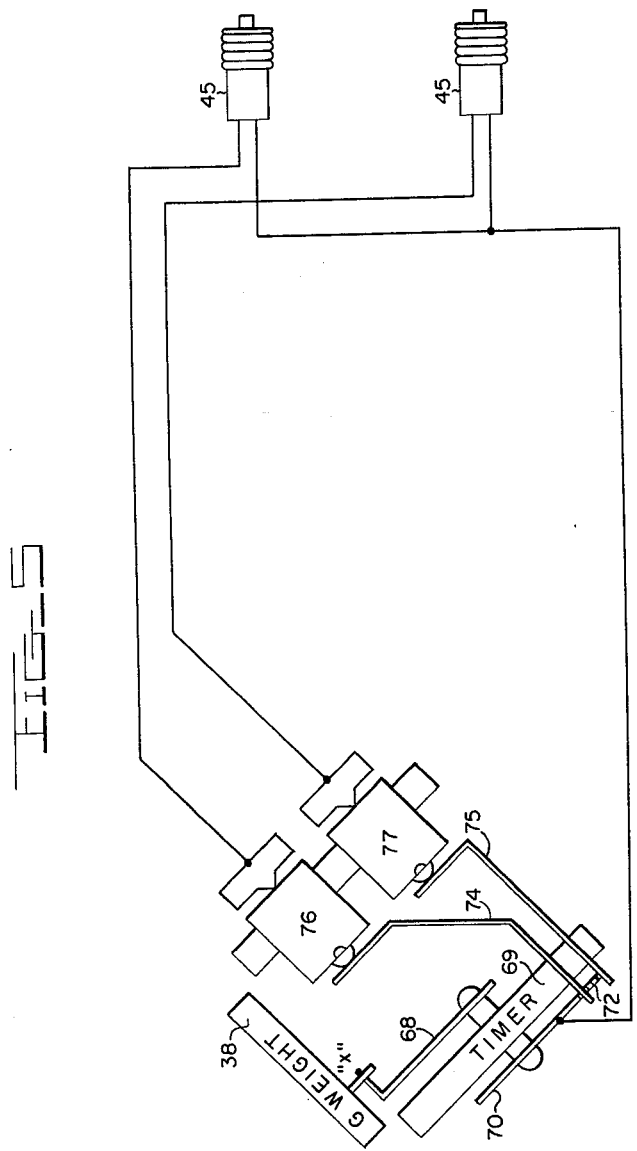

United States Patent Office 3,072,363
Patented Jan. 8, 1963

3,072,363
SPIN ADJUSTING MECHANISM
Robert C. Baumann, Alexandria, Va., and Leopold Winkler, Washington, D.C., assignors to the United States of America as represented by the Secretary of the Navy
Filed Apr. 30, 1959, Ser. No. 810,196
15 Claims. (Cl. 244—1)
(Granted under Title 35, U.S. Code (1952), sec. 266)

The invention described herein may be manufactured and used by or for the Government of the United States of America for governmental purposes without the payment of any royalties thereon or therefor.

This invention relates in general to spin adjusting mechanisms and more particularly to a satellite spin retarding mechanism.

In the field of space exploration through orbiting satellites one of the problems encountered is that of providing a desired spin rate for the orbiting body. An adjustment of spin rate is usually required since the rate imparted during the flight phase may exceed that desired, e.g. through bearing friction or by direct connection causing the satellite to gain spin from the launching vehicle. Certain adjustments may be made to the spin rate by changing or correcting the many components and factors imparting spin to the satellite, however, it is often not possible to attain the desired spin rate through varying such parameters. The present invention will produce the desired spin rate when conventional means for adjusting the parameters affecting spin rate may not. There is thus provided a simple, compact mechanism for accurately increasing or decreasing satellite spin rate.

Accordingly, it is an object of the present invention to provide a spin adjusting mechanism that will furnish a desired number of compensating revolutions.

Another object of this invention is to provide a simplified spin retarding mechanism that can be adapted to reduce spinning without otherwise disturbing the spinning body.

A further object of the present invention is to provide a simplified spin retarding mechanism capable of a wide range of adjustment of its counter-spin force.

A further object of this invention is to provide a simplified spin adjusting mechanism of minimum weight in relation to the force produced.

Other objects and advantages of this invention will become apparent upon a careful consideration of the following description when read in conjunction with the accompanying drawings in which:

FIG. 1 is an isometric view of a first embodiment of the invention.

FIG. 2 shows a view partly in section of the components of the first embodiment depicted in FIG. 1.

FIG. 3 is another view partly in section of some of the components shown in FIG. 2.

FIG. 5 is a schematic drawing illustrating the actuation of the separation and spin retarding mechanisms.

Figure 4:
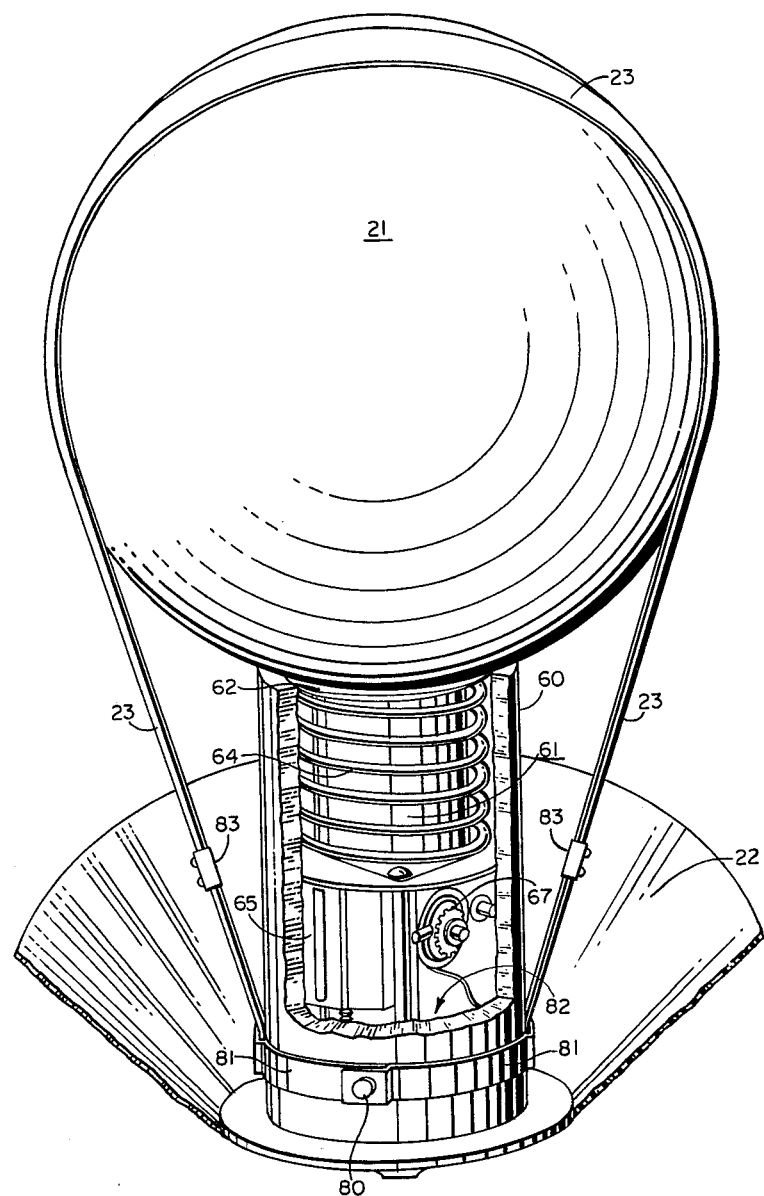
FIG. 4 is an isometric view of the separation mechanism used with the embodiment of FIG. 1.

In accordance with the teachings of the present invention a spin retarding mechanism is provided that will reduce the spin rate of a launched satellite by a predetermined number of revolutions. The reduction in spin rate is accomplished by the controlled release of gas under pressure through nozzles positioned so that the thrust produced is opposite to the rotational torque imparted to the satellite assembly through the bearing assembly. In the first embodiment of the invention, a 2,000 p.s.i.g. charge of compressed nitrogen should produce a maximum reduction of approximately 80 r.p.m.

Referring to FIG. 1, a spin retarding mechanism is shown in relation to an object whose spin is to be retarded, although it could similarly be advanced, in this instance a space satellite designed for space exploration. In FIG. 1, satellite 21 is shown positioned above heat shield 22 which is supported by spin retarding mechanism 11. The spin retarding mechanism includes nozzle arms 15 and 16 which are attached to sleeve 12 by flanges 17 and 18. Sleeve 12, which may be referred to generally as a casing, is attached at flange 14 to the supporting structure of, in this embodiment, the third stage of the rocket. More specifically, flange 14 is attached to a sleeve, not shown, which is bearing-mounted on the forward end of the third stage, while flange 13 of sleeve 12 is attached to heat shield 22. It will be appreciated that any of a variety of attaching means may be employed, such as bolt and cotter pin, and that detaching means such as those described in Technical Note D-497, National Aeronautics and Space Administration, April 1961, may be used to detach satellite 21 from sleeve 12 and sleeve 12 from its supporting structure. Nozzles 19 and 20 complete the operable parts seen in FIG. 1. Satellite 21 is held in position against a spring loaded detaching mechanism, shown in FIG. 4, by strap 23, with the detaching mechanism attached to heat shield 22.

FIG. 2 shows components of the embodiment of FIG. 1 in a section along line A—A of that figure. The sectional showing of sleeve 12 includes pressure sphere 24, timing mechanism 25, piston 29, portion thereof 30 and recess 31. Crossarm 33 is inserted through piston 29, is retained in the recess indicated at 46, and abuts against surface 36 except when it is inserted in slot 44, shown in FIG. 3, in fitting 32. Weight 38 is spring loaded by spring 39 and operates to actuate timing mechanism 25, while batteries 26 provide energy for actuating cartridges 45, shown in FIG. 3. The components referred to are, in a preferred embodiment, of rigid material with the exception of some parts of the timing mechanism which are of resilient material. Other components, e.g. the pressure sphere, also can be of resilient material.

In FIG. 3 sleeve 12 and the mechanism it contains are shown in sections taken along line B—B in FIG. 2. Nozzle 19 is seen in a section along line C—C in FIG. 1 with nozzle arm 15 having passage 43 connecting with orifice 42. The sections along B—B is at two levels, the lower level showing cartridges 45 connected to frame 51 at posts 52 while the expansion chambers 53 of the cartridges are shown secured to fitting 32 by pins 54. Cavities 55 are provided to accommodate expansion chambers 53 when the cartridges are actuated. The upper level along line B—B illustrates slot 44 in relation to crossarm 33, the slot being adapted to permit passage of the crossarm when the two are aligned.

The spin retarding mechanism is set in operation in the embodiment shown by the inertia of movable weight 38 with respect to its enclosure causing the weight to lag the acceleration of the enclosure, which latter is a part of the mechanism in sleeve 12. Springs 39 have a predetermined compressibility and are compressible by movable weight 38 at a selected acceleration of the assembly. In the first embodiment, an acceleration of approximately 12-g is required to move the weight to full compression of the spring. Timing mechanism 25 is adapted to be armed when weight 38 has held springs 39 compressed a selected time interval, for example, two seconds. The timing mechanism will remain armed during the time a force of 12-g is applied, and then will start to run for a selected period of time, for example, thirty seconds when acceleration is reduced below 12-g. At the end of the 30-second period the timing mechanism will close electrical circuits between batteries 26 and each of the cartridges causing firing of the cartridges. The gases generated by firing of the cartridges causing expansion of chamber 53 into cavities 55, thereby rotating fitting 32 approximately 45° clockwise and aligning slot 44 with crossarm 33.

Pressure sphere 24 contains, in the first embodiment, nitrogen under predetermined pressure which provides the force necessary to reduce the r.p.m. of the satellite to a desired number. Before fitting 32 is rotated by expansion chambers 53, the gas under pressure in the sphere is prevented from escaping by O-rings 34 and 35. Continual pressure is maintained against the end of piston 29 exposed to the gas so that when slot 44 is aligned with crossarm 33 ports 40 and 41 are opened upon movement of the piston into recess 31. Compressed gas can now flow from sphere 24 through nozzle arms 15 and 16 and out nozzles 19 and 20 expanding as it passes through the nozzles and exerting force against the diverging walls of the orifices. The amount of force exerted at each nozzle is a function of the pressure in sphere 24, while the rotational torque resulting can be varied by varying the length of nozzle arms 15 and 16. In the first embodiment, a preliminary charge of 6.7 grams of nitrogen produced a spin reduction of 56 r.p.m.

It will be appreciated that increasing the capacity of the pressure sphere will increase the time during which force will be exerted at the nozzles, and that the torque produced can be varied as stated by varying the length of the moment arms. This ability to alter two separate factors to produce a desired torque provides a flexibility of adjustment not possible in prior art devices. It will also be appreciated that the timing mechanism can be actuated by means other than a weight responsive to inertia, e.g. a spring or governor, and that the present invention may be used to increase or decrease acceleration as well as to advance or retard a spin rate.

FIG. 4 shows the means for detaching satellite 21 from heat shield 22 and includes casing 60 which fits over the mechanism 61 and plunger 62 which is inserted into spring 64 and which transmits the ejection force of the spring to satellite 21. Strap 23 is attached at its ends to semicircular girth rings 81 through which locking pins 80 extend, the strap having length adjusting means indicated at 83 for providing the desired compression of spring 64.

Weight 65 operates to set the timing mechanism into actuation in a similar manner as does weight 38 with respect to the spin retarding mechanism, the major difference between actuation of the respective mechanisms being that the detaching timer is set for a period sufficiently longer than the spin retarding timer to permit the spin retarding mechanism to complete its operation before ejection spring 64 is released.

FIG. 5 illustrates schematically the mechanical and electrical operation of the retarding and detaching mechanisms. As described in connection with FIG. 2, weight 38 lags the acceleration of its enclosure compressing spring 39 a predetermined amount at a selected acceleration of the assembly. Timing mechanism 67 in FIG. 4, and a similar mechanism not shown in the spin retarding assembly, are adapted to be actuated when weights 38 and 65 have held their respective springs compressed a selected time. Movement of the weights downward and depression for a selected time causes arms 68 to rotate and set rotary mechanical timer 69 in operation. Timer 69 then rotates cam 70 which, after a predetermined period, moves pointer 72 into contact with connectors 74 and 75 completing a circuit between batteries 76 and 77 and ground thereby firing cartridges 45 in the spin retarding mechanism and cartridges 45 in the detaching mechanism. In both mechanisms firing of the cartridges produces rotation of a member which, respectively, releases gas through nozzles 19 and 20, and withdraws locking pins 80 holding spring 64 in compression through strap 23 and girth rings 81 by rotation of a cam having projections connected to pins 80. The cartridges or explosive motors in the detaching mechanism are in the area indicated by arrow 82.

Many modifications and variations of the present invention are possible pursuant to the above teachings. It is therefore to be understood that its practice is not to be limited by the specific examples in the foregoing description and that this invention is only to be limited by the scope of the appended claims.

What is claimed is:

1. A spin adjusting mechanism for adjusting the spin rate of an object spinning about a defined axis comprising condition responsive rotating means attached to said object and disposed about said axis, said rotating means operative upon the occurrence of a predetermined energy state of said object, said rotating means including means for storing gas under pressure, said rotating means including outlets for discharging said gas, said outlets disposed such that the force exerted in the exiting of said gas will act to alter the rate of rotation of said object.

2. A spin adjusting mechanism for adjusting the spin rate of an object spinning about a defined axis comprising condition responsive rotating means attached to said object and disposed about said axis, said rotating means operative upon the occurrence of a predetermined energy state of said object, said rotating means including means for storing gas under pressure, said rotating means including outlets for discharging said gas, said outlets disposed such that the force exerted in the exiting of said gas will act to alter the rate of rotation of said object, and detaching means connected with said rotating means for detaching said rotating means from said object.

3. A spin adjusting mechanism for adjusting the spin rate of an object spinning about a defined axis comprising condition responsive rotating means attached to said objects and disposed about said axis, said rotating means operative upon the occurrence of a predetermined energy state of said object, said rotating means including a pressure sphere of rigid material having a predetermined pressure capacity, a predetermined quantity of compressed gas in said sphere, exiting means including at least one nozzle for expanding and exiting said gas, said exiting means connected to said rotating means such that said nozzle will travel a circular path about said axis and exit said gas along a line substantially tangent to said circular path, and releasing means connected to said pressure sphere for releasing gas under pressure.

4. A spin adjusting mechanism for adjusting the spin rate of an object spinning about a defined axis comprising rotating means attached to said object and disposed about said axis, said rotating means including a pressure sphere of rigid material having a predetermined pressure capacity, exiting means including at least one nozzle for expanding and exiting said gas, said exiting means connected to said rotating means such that said nozzle will travel a circular path about said axis and exit said gas along a line substantially tangent to said circular path, releasing means connected to said pressure sphere for releasing gas under pressure, and inertia operative actuating means including a movable weight responsive at a predetermined acceleration to actuate said releasing means.

5. A spin adjusting mechanism for adjusting the spin rate of an object spinning about a defined axis comprising rotating means attached to said object and disposed about said axis, said rotating means including a casing of rigid material symmetrical in shape, a pressure sphere disposed in said casing and having a predetermined pressure capacity, exiting means including at least one nozzle for expanding and exiting said gas, said exiting means connected to said rotating means such that said nozzle will travel a circular path about said axis and exit said gas along a line substantially tangent to said circular path, releasing means connected to said pressure sphere for releasing gas under pressure, inertia operative actuating means including a movable weight responsive at a predetermined acceleration to actuate said releasing means, and detaching means connected with said rotating means for detaching said rotating means from said object.

6. A spin adjusting mechanism for adjusting the spin rate of an object spinning about a defined axis comprising rotating means attached to said object and disposed about said axis, said rotating means including a casing of rigid material symmetrical in shape, a pressure sphere disposed in said casing and having a predetermined pressure capacity, exiting means including at least one nozzle for expanding and exiting said gas, at least one conduit of rigid material connected to said releasing means for displacing said exiting means a selected distance from said casing, said exiting means and said conduit disposed with respect to said casing such that said nozzle will travel a circular path about said axis and exit said gas along a line substantially tangent to said circular path, releasing means connected to said pressure sphere for releasing gas under pressure, inertia operative actuating means including a movable weight responsive at a predetermined acceleration to actuate said releasing means, and detaching means connected with said rotating means for detaching said rotating means from said object.

7. A spin adjusting mechanism for adjusting the spin rate of an object spinning about a defined axis comprising rotating means attached to said object and disposed about said axis, said rotating means including a casing of rigid material symmetrical in shape, a pressure sphere disposed in said casing and having a predetermined pressure capacity, exiting means including at least one nozzle for expanding and exiting said gas, said exiting means connected to said rotating means such that said nozzle will travel a circular path about said axis and exit said gas along a line substantially tangent to said circular path, releasing means connected to said pressure sphere for releasing gas under pressure, and actuating means responsive to the acceleration of said object and connected to said releasing means for actuating said releasing means.

8. A spin adjusting mechanism for adjusting the spin rate of an object spinning about a defined axis comprising rotating means attached to said object and disposed about said axis, said rotating means including a casing of rigid material symmetrical in shape, a pressure sphere disposed in said casing and having a predetermined pressure capacity, exiting means including at least one nozzle for expanding and exiting said gas, said exiting means connected to said casing such that said nozzle will travel a circular path about said axis and exit said gas along a line substantially tangent to said circular path, releasing means connected to said pressure sphere for releasing gas under pressure, inertia operative actuating means including a spring loaded weight responsive at a predetermined acceleration to actuate said releasing means, and detaching means connected with said rotating means for detaching said rotating means from said object.

9. A spin adjusting mechanism for adjusting the spin rate of an object spinning about a defined axis comprising rotating means attached to said object and disposed about said axis, said rotating means including a casing of rigid material symmetrical in shape, a pressure sphere disposed in said casing and having a predetermined pressure capacity, existing means including at least one nozzle for expanding and exiting said gas, at least one conduit of rigid material connected to said releasing means for displacing said exiting means a selected distance from said casing, said exiting means and said conduit disposed with respect to said casing such that said nozzle will travel a circular path about said axis and exit said gas along a line substantially tangent to said circular path, releasing means connected to said pressure sphere for releasing gas under pressure, inertia operative actuating means including a spring loaded weight responsive at a predetermined acceleration to actuate said releasing means, and detaching means connected with said rotating means for detaching said rotating means from said object.

10. A spin adjusting mechanism for adjusting the spin rate of an object spinning about a defined axis comprising rotating means attached to said object and disposed about said axis, said rotating means including means for storing gas under pressure, said rotating means including outlets for discharging said gas, said outlets disposed such that the force exerted in the exiting of said gas will act to alter the rate of rotation of said object, releasing means connected to said rotating means for releasing gas under pressure, actuating means connected to said releasing means for actuating said releasing means, said actuating means including a timing mechanism adapted to be armed by an inertia responsive weight at a selected acceleration and set in operation at a selected deceleration of said object.

11. A spin adjusting mechanism for adjusting the spin rate of an object spinning about a defined axis comprising rotating means attached to said object and disposed about said axis, said rotating means including means for storing gas under pressure, said rotating means including outlets for discharging said gas, said outlets disposed such that the force exerted in the exiting of said gas will act to alter the rate of rotation of said object, releasing means connected to said rotating means for releasing gas under pressure, actuating means connected to said releasing means for actuating said releasing means, said actuating means including a timing mechanism adapted to be armed by an inertia responsive weight at a selected acceleration and set in operation at a selected deceleration of said object, and detaching means connected with said rotating means for detaching said rotating means from said object.

12. A spin adjusting mechanism for adjusting the spin rate of an object spinning about a defined axis comprising rotating means attached to said object and disposed about said axis, said rotating means including a pressure sphere of rigid material having a predetermined pressure capacity, a predetermined quantity of compressed gas in said sphere, exiting means including at least one nozzle for expanding and exiting said gas and disposed with respect to said rotating means such that said nozzle will travel a circular path about said axis and exit said gas along a line substantially tangent to said circular path, releasing means connected to said pressure sphere for releasing gas under pressure, actuating means connected to said releasing means for actuating said releasing means, said actuating means including a timing mechanism adapted to be armed by an inertia responsive weight at a selected acceleration and set in operation at a selected deceleration of said object.

13. A spin adjusting mechanism for adjusting the spin rate of an object spinning about a defined axis comprising rotating means attached to said object and disposed about said axis, said rotating means including a pressure sphere of rigid material having a predetermined pressure capacity, exiting means including at least one nozzle for expanding and exiting said gas and disposed with respect to said rotating means such that said nozzle will travel a circular path about said axis and exit said gas along a line substantially tangent to said circular path, releasing means connected to said pressure sphere for releasing gas under pressure, actuating means connected to said releasing means for actuating said releasing means, said releasing means including a casing and a piston, said piston having a crossarm abutting against said casing, said casing having a slot adapted to receive said piston with crossarm upon said casing being rotated a selected number of degrees.

14. A spin adjusting mechanism for adjusting the spin rate of an object spinning about a defined axis comprising rotating means attached to said object and disposed about said axis, said rotating means including a pressure sphere of rigid material having a predetermined pressure capacity, exiting means including at least one nozzle for expanding and exiting said gas and disposed with respect to said rotating means such that said nozzle will travel a circular path about said axis and exit said gas along a line substantially tangent to said circular path, releasing means connected to said pressure sphere for releasing gas under pressure, said releasing means including a casing and a piston, said piston having a crossarm abutting against said casing, said casing having a slot adapted to receive said piston with crossarm upon said casing being rotated a selected number of degrees, and inertia operative actuating means including a movable weight responsive at a predetermined acceleration to actuate said releasing means.

15. A spin adjusting mechanism for adjusting the spin rate of an object spinning about a defined axis comprising rotating means attached to said object and disposed about said axis, said rotating means including a pressure sphere of rigid material having a predetermined pressure capacity, exiting means including at least one nozzle for expanding and exiting said gas and disposed with respect to said rotating means such that said nozzle will travel a circular path about said axis and exit said gas along a line substantially tangent to said circular path, releasing means connected to said pressure sphere for releasing gas under pressure, said releasing means including a casing and a piston, said piston having a crossarm abutting against said casing, said casing having a slot adapted to receive said piston with crossarm upon said casing being rotated a selected number of degrees, and actuating means connected to said releasing means for actuating said releasing means, said actuating means including a timing mechanism adapted to be armed at a selected acceleration and set in operation at a selected deceleration of said object.

References Cited in the file of this patent
UNITED STATES PATENTS

| | | |
|---|---|---|
| 888,415 | Barber | May 19, 1908 |
| 1,820,946 | Pitcairn | Sept. 1, 1931 |
| 2,473,331 | Donley | June 14, 1949 |
| 2,644,397 | Katz | July 7, 1953 |
| 2,673,696 | Pullin | Mar. 30, 1954 |
| 2,718,364 | Crabtree | Sept. 20, 1955 |
| 2,738,021 | Nagler | Mar. 13, 1956 |
| 2,987,273 | Wanamaker et al. | June 6, 1961 |